(12) United States Patent
Qiang et al.

(10) Patent No.: US 10,310,098 B1
(45) Date of Patent: Jun. 4, 2019

(54) DETERMINE POSITION OF SCATTERED EVENTS IN PIXELATED GAMMA DETECTOR USING INVERSE ENERGY WEIGHTING

(71) Applicant: CANON MEDICAL SYSTEMS CORPORATION, Otawara-shi (JP)

(72) Inventors: Yi Qiang, Vernon Hills, IL (US); Xiaoli Li, Buffalo Grove, IL (US); Evren Asma, Buffalo Grove, IL (US)

(73) Assignee: CANON MEDICAL SYSTEMS CORPORATION, Otawara-shi (JP)

( * ) Notice: Subject to any disclaimer, the term of this patent is extended or adjusted under 35 U.S.C. 154(b) by 0 days.

(21) Appl. No.: 16/153,486

(22) Filed: Oct. 5, 2018

(51) Int. Cl.
*G01T 1/00* (2006.01)
*G01T 1/166* (2006.01)
*G01T 1/202* (2006.01)
*G01T 1/164* (2006.01)

(52) U.S. Cl.
CPC .......... *G01T 1/1663* (2013.01); *G01T 1/1648* (2013.01); *G01T 1/202* (2013.01)

(58) Field of Classification Search
CPC ...... G01T 1/1663; G01T 1/1648; G01T 1/202
See application file for complete search history.

(56) References Cited

U.S. PATENT DOCUMENTS

| 5,841,140 | A | 11/1998 | McCroskey et al. | |
|---|---|---|---|---|
| 2009/0114829 | A1 | 5/2009 | He et al. | |
| 2016/0187497 | A1 | 6/2016 | Lerche et al. | |
| 2019/0000406 | A1* | 1/2019 | Liu | G01T 1/2018 |

FOREIGN PATENT DOCUMENTS

JP 2001-124857 A 5/2001

OTHER PUBLICATIONS

K. A. Comanor, et al., "Algorithms to Identify Detector Compton Scatter in PET Modules", IEEE Transactions on Nuclear Science, vol. 43, No. 4, Aug. 1996, pp. 2213-2218.
Weiyi Wang, "Techniques and Applications of Compton Imaging for Position-Sensitive Gamma-Ray Detectors", A dissertation Submitted in Partial Fulfillment of the Requirements for the Degree of Doctor of Philosophy in the University of Michigan, 2011.

* cited by examiner

*Primary Examiner* — David P Porta
*Assistant Examiner* — Mamadou Faye
(74) *Attorney, Agent, or Firm* — Oblon, McClelland, Maier & Neustadt, L.L.P.

(57) ABSTRACT

A method and apparatus are provided for positron emission imaging to correct a position at which a gamma ray was detected, when the gamma ray is scattered during detection. When Compton scattering occurs during detection of a gamma ray, the energy of the gamma ray deposited in multiple crystals in an array of detector elements. The corrected position is determined as a weighted sum of the position of the multiple crystals, each weighted by an inverse of the energy measured at the respective crystal. Further, the inverse-energy weight can be raised to a power p. A minimum energy threshold can be applied to determine the multiple crystals at which the gamma ray energy is deposited. The corrected position can be a floating position or can be rounded to a nearest crystal or to a nearest virtual sub-crystal.

20 Claims, 10 Drawing Sheets

DETERMINE POSITION OF SCATTERED EVENTS IN PIXELATED GAMMA DETECTOR USING INVERSE ENERGY WEIGHTING

FIELD

This disclosure relates to position detection in gamma ray detectors, and, more particularly, to improved position detection in the presence of Compton scatter in positron emission tomography (PET) scanners and single-photon emission computed tomography (SPECT) scanners for medical imaging, for example.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In positron emission tomography (PET) imaging, a tracer agent is introduced into the patient, and the physical and bio-molecular properties of the agent cause it to concentrate at specific locations in the patient's body. The tracer emits positrons, resulting in an annihilation event occurs when the positron collides with an electron that produces two gamma rays (at 511 keV) traveling at substantially 180 degrees apart.

PET imaging systems use detectors positioned around the patient to detect coincidence pairs of gamma rays. A ring of detectors can be used in order to detect gamma rays coming from each angle. Thus, a PET scanner can be substantially cylindrical to be maximize the capture of the isotropic radiation. A PET scanner can be composed of several thousand individual crystals (e.g., Lutetium Orthosilicate (LYSO) or other scintillating crystal) which are arranged in two-dimensional scintillator arrays that are packaged in modules with photodetectors to measure the light pulses from respective scintillation events. For example, the light from respective elements of a scintillator crystal array can be shared among multiple photomultiplier tubes (PMTs) or can be detected by silicon photomultipliers (SiPMs) having a one-to-one correspondence with the elements of a scintillator crystal array.

When PMTs are used as the photodetectors, Anger logic can be used based on the relative geometry between the scintillating crystal elements and the respective PMTs, which determines the relative pulse energy measured by the photodetectors. Using Anger logic/arithmetic and a floodmap calibrated lookup table, the relative pulse energies of the PMTS are compared to determine at which position within the crystal array (i.e., which crystal element) the scintillation event occurred.

To reconstruct the spatio-temporal distribution of the tracer via tomographic reconstruction principles, each detected event is characterized for its energy (i.e., amount of light generated), its location, and its timing. By detecting the two gamma rays, and drawing a line between their locations, i.e., the line-of-response (LOR), one can determine the likely location of the original disintegration. The timing information can also be used to determine a statistical distribution along the LOR for the annihilation even based on a time-of-flight (TOF) between the two gamma rays.

While this process will only identify a line of possible interaction, by accumulating a large number of those lines, and through a tomographic reconstruction process, the original distribution can be estimated.

Single-photon emission computed tomography (SPECT) is similar to PET except a collimator is used to restrict the solid angle of gamma rays incident on the respective detector elements (e.g., the respective elements in the scintillator crystal array), making reconstruction possible using single gamma ray detection events as opposed to requiring coincidences to determine a LOR.

Both PET and SPECT imaging depend on the ability to determine the position at which a gamma ray is detected. However, scatter events can result in a part of the gamma ray energy being deposited in the original detection crystal element with the scattered gamma ray depositing the remaining energy in one or more other crystal elements, generating ambiguity regarding which crystal element was the original detection element. Conventional methods of position correction to resolve suffer from at least two shortcomings. First, conventional position-correction methods are limited to single scatter events (i.e., the gamma ray energy scatters just once, resulting in the energy being deposited in only two crystal elements). Second, conventional position-correction methods fail when the two crystal elements have approximately equal energy from the gamma ray. Accordingly, more robust and scalable methods are desired for position correction/determination when the gamma ray is scattered/shared among multiple scintillator crystal elements in a gamma detector/camera.

BRIEF DESCRIPTION OF THE DRAWINGS

A more complete understanding of this disclosure is provided by reference to the following detailed description when considered in connection with the accompanying drawings, wherein.

DETAILED DESCRIPTION

As discussed above the accuracy of image reconstruction using positron emission tomography (PET) or single-photon emission computed tomography (SPECT) depends on the resolution and accuracy with which the point of detection can be determined. When no scattering occurs, this resolution is typically limited by the size of the array elements in a scintillator crystal array (i.e., the cross-sectional area of each optically isolated crystal in the array of scintillator crystals). However, scattering of a gamma ray in a PET detector can result in parts of its energy being deposited in multiple crystals within the crystal array, which limits resolution by reducing the accuracy with which the point of entry of the gamma ray can be determined. In Compton scattering, the gamma ray (photon) interacts with a charged particle (e.g., an electron in the shell of an atom of one crystal). Part of the energy and momentum from the photon is transferred to the electron, ejecting it from the atom at angle φ and causing a lower energy gamma ray (photon) to be scattered at angle θ.

Figure 1A:
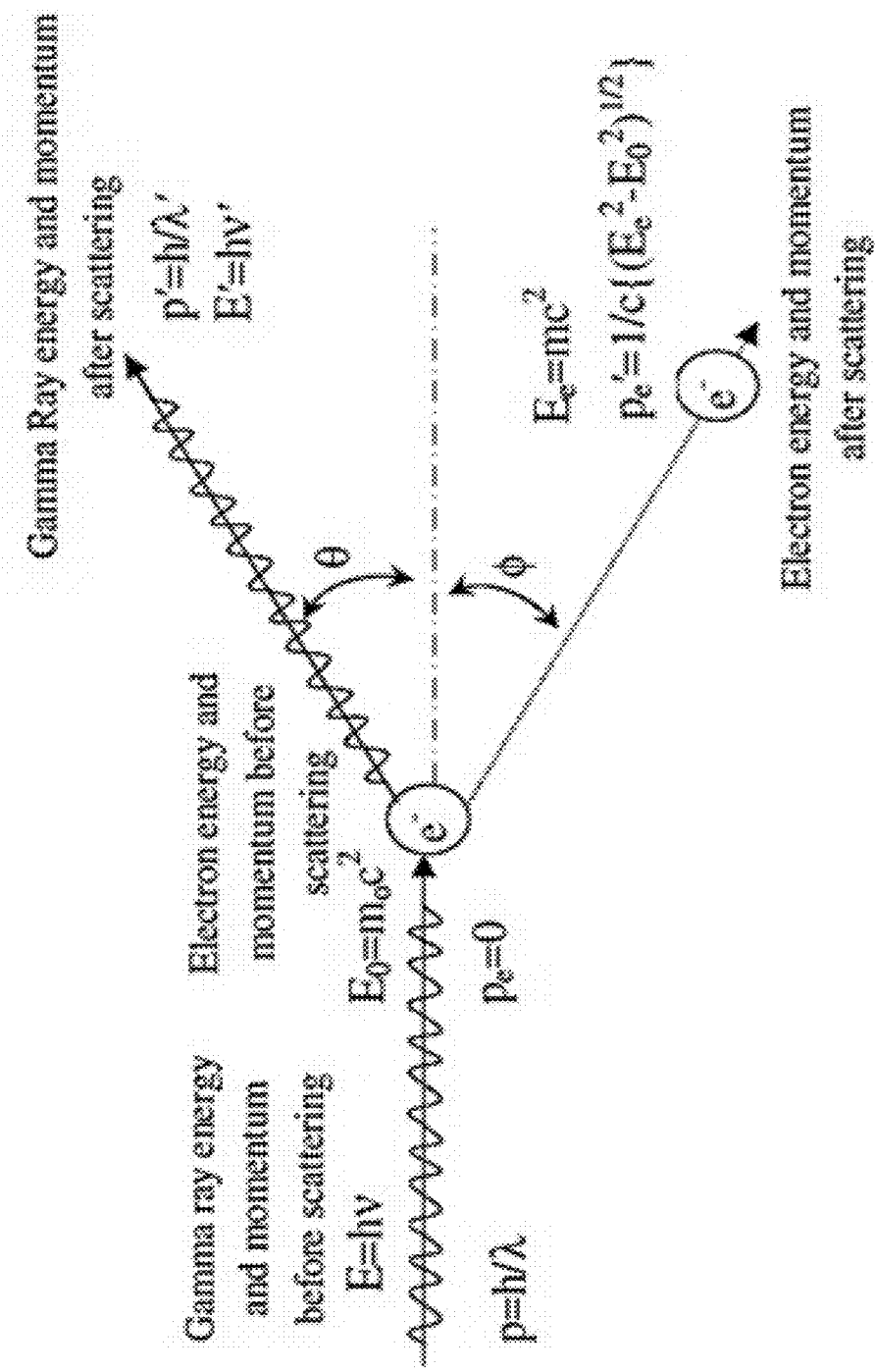
FIG. 1A shows a diagram of Compton scattering.
Figure 1B:
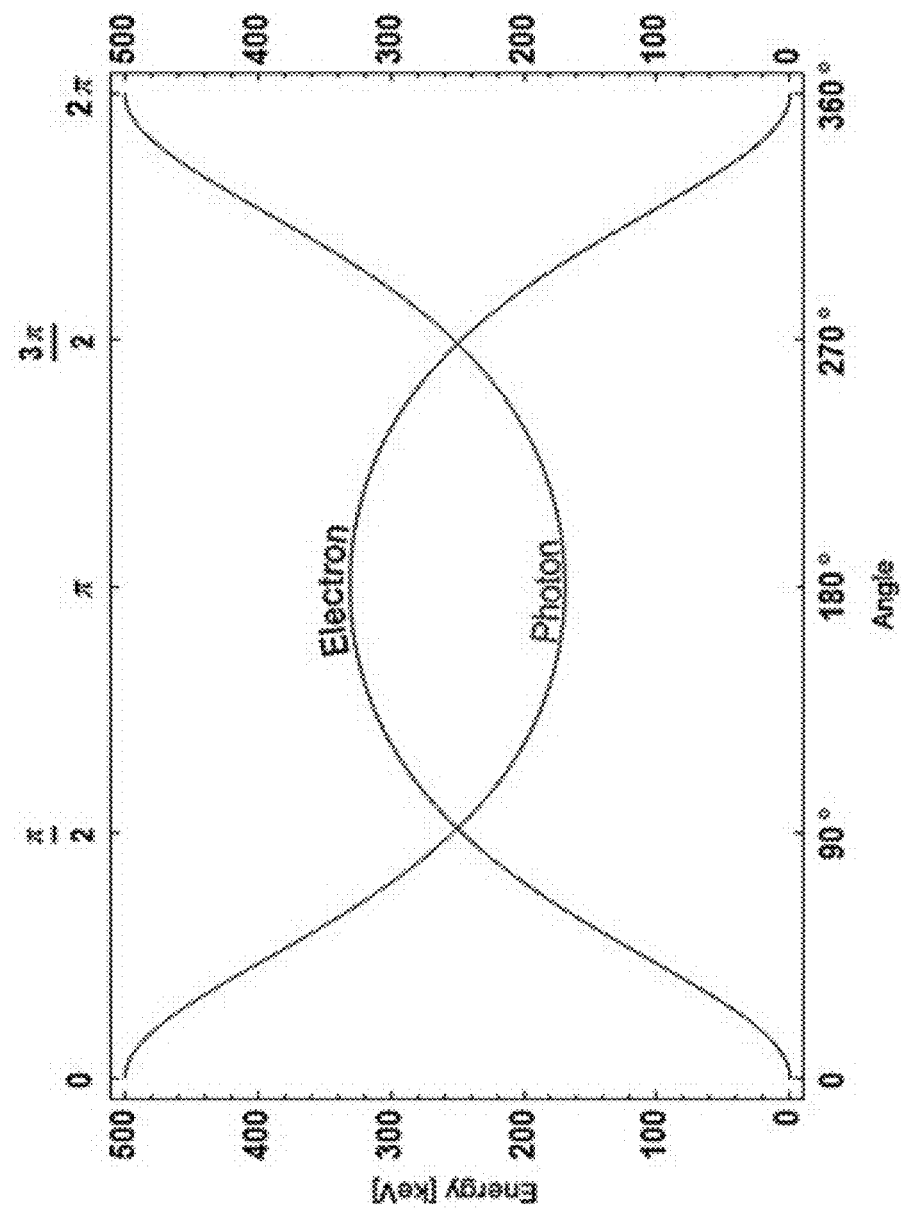
FIG. 1B shows a plot of the scatter electron and gamma ray (photon) energy as a function of the scatter angle for Compton scattering.

Referring now to the drawings, wherein like reference numerals designate identical or corresponding parts throughout the several views, FIG. 1A shows the relation between the energy and momentum of the incoming gamma ray, outgoing gamma ray, and scattered electron. The angles φ and θ are determined by the fact that the scatter conforms to the laws of conservation of energy and momentum. The energy of the scattered electron is the energy deposited in the first crystal. Further, the remaining energy is carried away by the outgoing gamma ray. Consequently, when there is only a single scattering event, the energy of outgoing gamma ray is deposited in a second crystal by converting, via photo-electric absorption, the energy of the outgoing gamma ray by in to secondary photons, (e.g., with wavelengths in the optical, ultra-violate, and infrared spectra). In general, these energies are related by the "Compton shift," which is that the difference between the wavelengths of the outgoing and incoming gamma rays, which is given by $$\lambda' - \lambda = \frac{h}{mc}(1 - \cos\theta),$$

wherein λ is the initial wavelength, λ' is the wavelength after scattering, h is the Planck constant, m is the electron rest mass, c is the speed of light, and θ is the scattering angle of the gamma ray. The energy is inversely related to the wavelength by the Planck constant h, i.e., E=h/λ. FIG. 1B shows that relation between the scattered photon energy and the electron energy as a function of the scatter angle, assuming the initial gamma ray photon energy is 511 keV.

Figure 2:
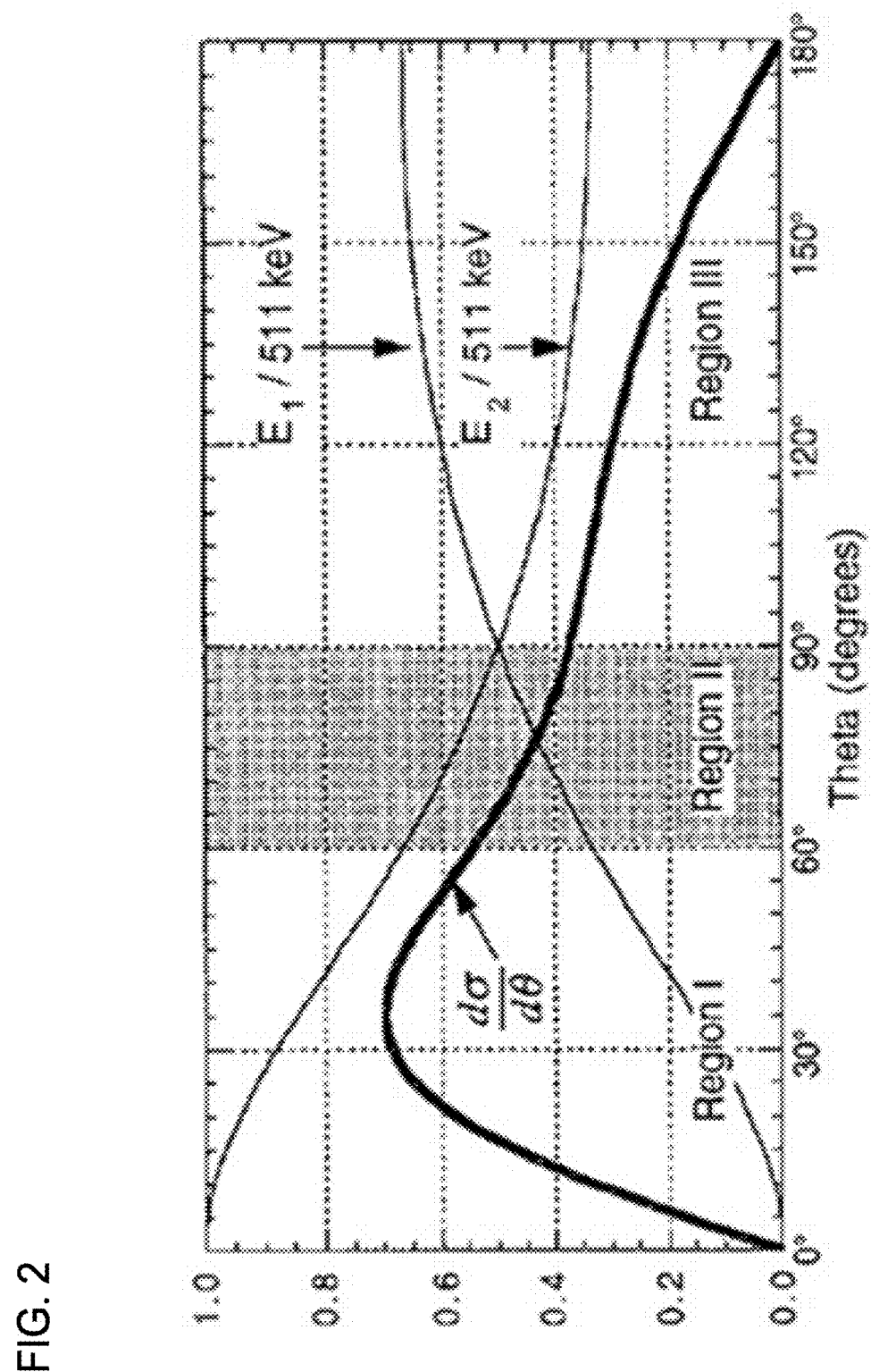
FIG. 2 shows a plot of scattering cross-section as function of the scatter angle for Compton scattering, according to one implementation.

FIG. 2 shows a non-limiting example of a plot for the Compton scatter cross-section dσ/dΩ as a function of the scattering angle θ. The scattering cross-section dσ/dΩ is typically greater for small scattering angles θ than for large scattering angles, making it more likely that the crystal will have the lesser amount of energy deposited is the first crystal, as opposed to the second crystal. Thus, a second-highest method can be used to estimate the entrance/detection position of the gamma ray as being the crystal having the second highest energy deposition. That is, on average, the electron carries less energy than the scattered photon. Accordingly, based on the most probably kinematics of the scattering, the crystal which has lower energy deposition can be used to identify the entry point (crystal ID) of the gamma ray, which is referred to as the second-highest-signal method.

In a single scatter event, detectors registering energies less than the second highest energy might be due to inadvertent light sharing (e.g., due to imperfect light shielding between scintillator crystals and/or light guides arranged between the crystal and detector elements. The second-highest method is not equipped to handle multiple scatter events. As discussed below, for methods that do account for multiple scattering (e.g., second order and higher-order scatter), an energy threshold can be applied to differentiate pulse energies resulting from scattered gamma rays from pulses on detector channels resulting from charge/light sharing, noise, or other confounding signals that fall below the energy threshold.

As discussed above, FIG. 2 illustrates the Compton scatter cross-section dσ/dΩ in arbitrary units together with the normalized energy $E_1$ ($E_2$) deposited in the first (second) crystal. As long as the energy in one crystal is below about 37% of the total 511 keV energy of the gamma ray (i.e., in Region I) then the second-highest-signal method will give the correct result. However, as shown in FIG. 2, when the second highest signal is above 37% of the total energy, there is ambiguity regarding whether the scattering event corresponds to Region II, in which the second highest signal corresponds to the entrance point of the original gamma ray, or Region III, in which the first highest signal corresponds to the entrance point of the original gamma ray and the second highest method fails. Accordingly, the second-highest-signal method is subject to ambiguity between Region II and Region III in which the scattered photon has similar energy to the electron. One way to reduce misidentification is to use a joint method that uses an energy threshold, and when the second highest signal is higher than this threshold, the crystal corresponding to the highest signal, rather than the second-highest signal, is identified as the crystal identification (ID) at which the original gamma ray entered the detector. Otherwise, the second highest signal is used as the crystal ID as in the second-highest-signal method.

Neither the joint method nor the second highest method is equipped to handle multiple scattering.

The methods described herein use another approach: inverse energy weighting. Inverse weighting relies on many of the above insights, which inform the second-highest signal and joint methods, but the inverse weighting method applies a simpler more robust approach, and can be generalized to multiple scatter detection events in which energy from an incident gamma ray results in multiple scattering events, depositing the gamma ray energy in three or more crystals. Further, the inverse energy weighting can be applied using either floating point positions for the crystal ID or using sub-crystal IDs to improve the accuracy of the estimation. Here, "floating point" positions means that the position can float independently from being rounded to a nearest crystal (e.g., the center of the nearest crystal) or being rounded to a virtual sub-crystal, as discussed below. That is, in certain implementations, the corrected position is rounded to a discretised grid based on the crystals or a sub-division of the crystals into virtual sub-crystals, but in other implementations the corrected position can be any real number (i.e., a "floating point" position), as opposed to be discretised to grid.

Figure 3A:
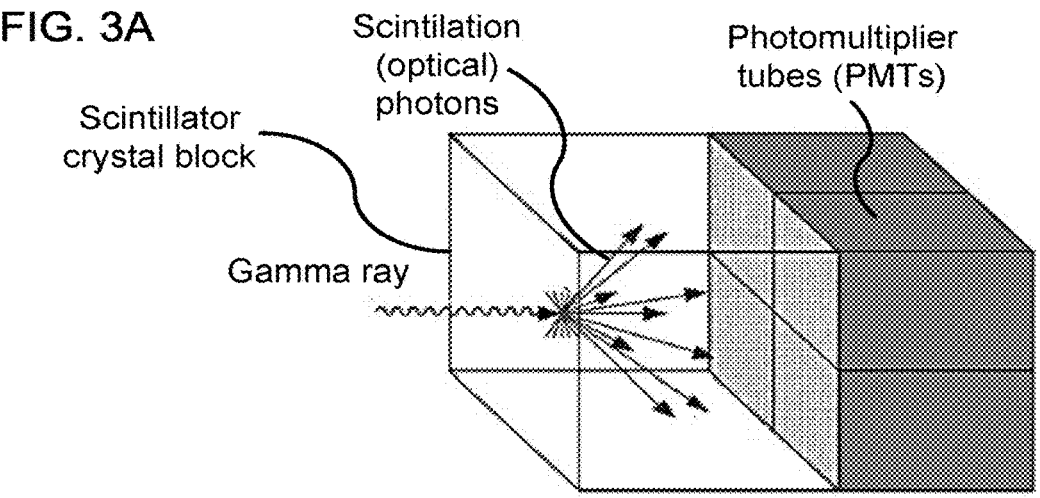
FIG. 3A shows a diagram of a gamma ray detector module having a single crystal block and photomultiplier tubes (PMTs), according to one implementation.
Figure 3B:
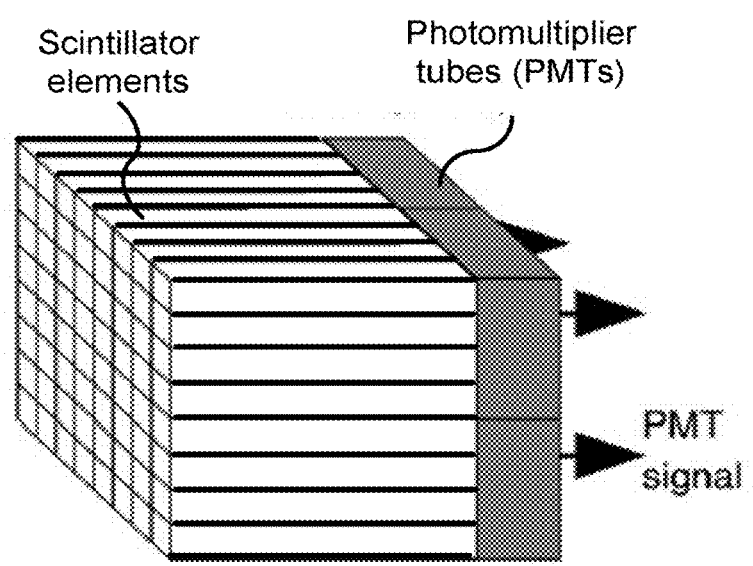
FIG. 3B shows a diagram of a gamma ray detector module having a block of crystals arranged as an array of scintillator elements and using PMTs as photodetectors, according to one implementation.
Figure 3C:
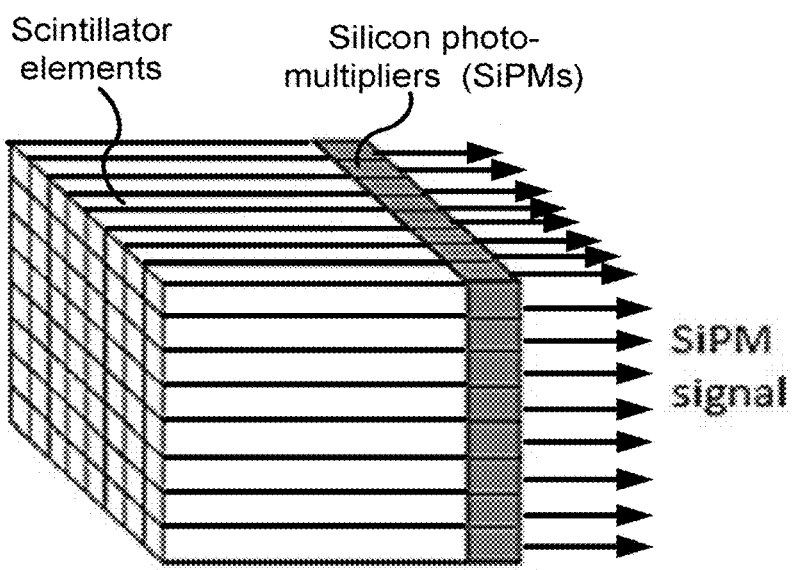
FIG. 3C shows a diagram of a gamma ray detector module having crystals arranged as the array of scintillator elements and using silicon photomultipliers (SiPMs) as photodetectors, according to one implementation.

FIGS. 3A, 3B, and 3C show a gamma ray detector (also referred to as a gamma camera) according to several implementations. In FIG. 3A, the scintillator crystal is a single monolithic block, and the location of the scintillation event converting the gamma ray photon into secondary photons that can be detected by an array of photodetectors, which are illustrated here as photomultipliers (PMTs). The location of the scintillation event can be determined using Anger arithmetic.

In FIG. 3B, the scintillator is cut into a periodic array of separate crystals separated and optically isolated by reflective barriers between the individual elements of the crystal array. When the photodetectors are PMTs, light sharing among the PMTs occurs after exiting the crystals, and scintillation events can be distinguished between individual elements of the scintillator array using Anger arithmetic. Anger arithmetic uses the ratios among the PMT signals to approximately determine locations, and then a floodmap calibration can be used to generate a lookup table that maps these approximate locations to respective indices of the crystal array.

In FIG. 3C, the light from each crystal element is detected by a respective silicon photomultiplier (SiPM). With each crystal having its own photodetector, the light sharing among photodetectors can be reduced. Further, each crystal having its own photodetector can result in enhanced resolution by enabling discrimination between simultaneous scintillation events occurring at different crystals within a single detection module (e.g., discriminating Compton scattering among adjacent crystals).

For many years, the most commonly used photo detectors for PET has been PMTs, which are vacuum tubes having a photo-cathode material with a work function that allows the conversion of incoming light into photoelectrons that are accelerated through an applied electric field and amplified by interacting with a cascade of dynodes. The resulting electrical current is proportional to the number of initial scintillation photons and therefore to the energy deposited in the scintillation crystal by the PET photon.

By segmenting the scintillator blocks (e.g., using many small SiPMs or exploiting the properties of position sensitive PMTs, e.g., using Anger arithmetic) the location of the photon detection can be determined. In FIGS. 3B and 3C small individual scintillation crystals that are a few millimeters in size are tightly packed into blocks/modules, which can be coupled to multiple photodetectors.

Figure 4:
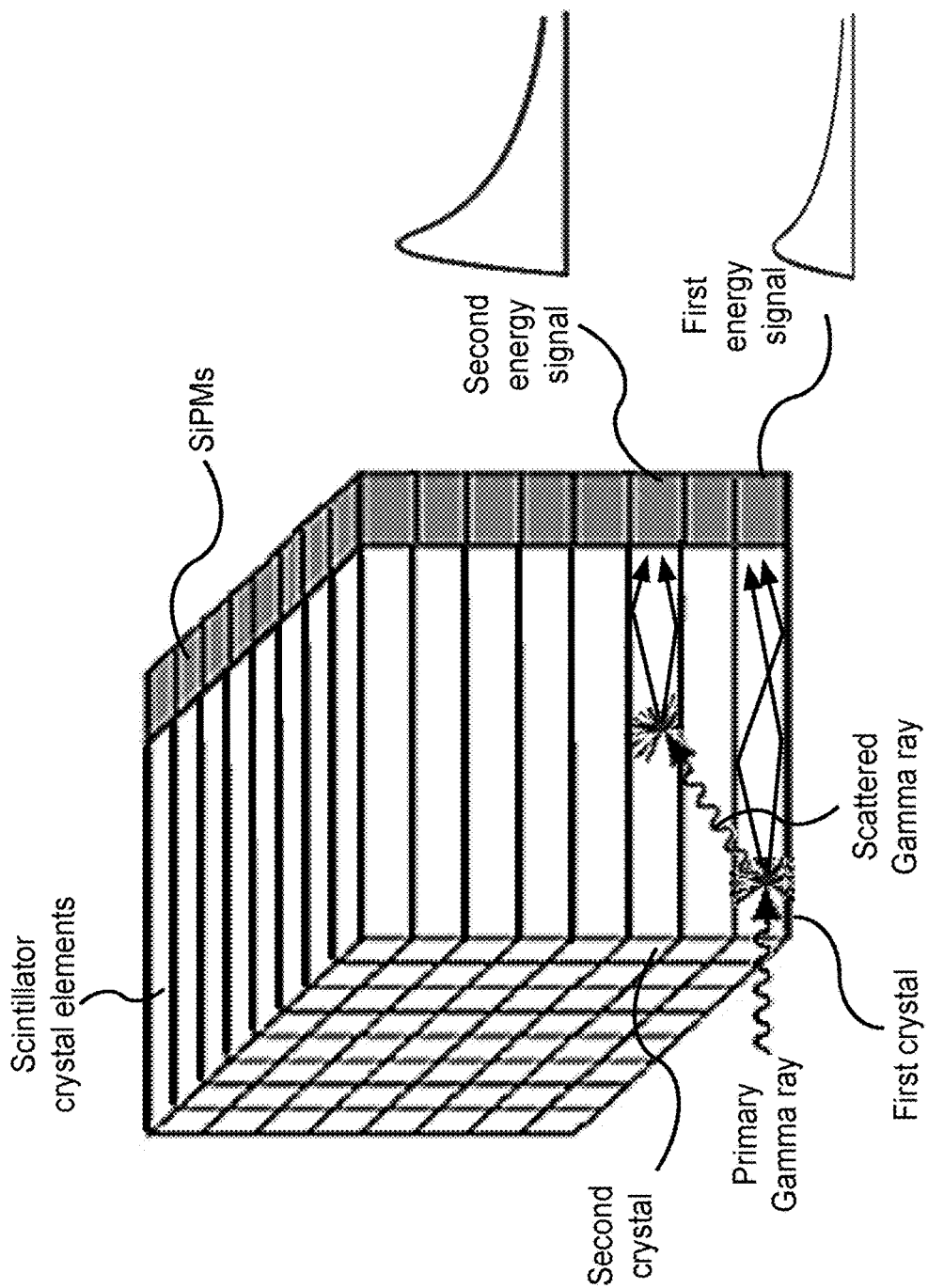
FIG. 4 shows an example of Compton scattering resulting in two energy signals from a first crystal and a second crystal respectively, according to one implementation.

FIG. 4 shows a non-limiting example of an incident gamma ray undergoing Compton scatter in a first crystal resulting in the remaining energy being deposited in a second crystal. The first and second crystals then respectively produce secondary photons via photoelectric absorption resulting in the corresponding SiPMs generating the first and second energy signals. Consistent with FIG. 1B, the scatter angle is small, and the energy in the first energy signal is less than the energy in the second energy signal.

Figure 5:
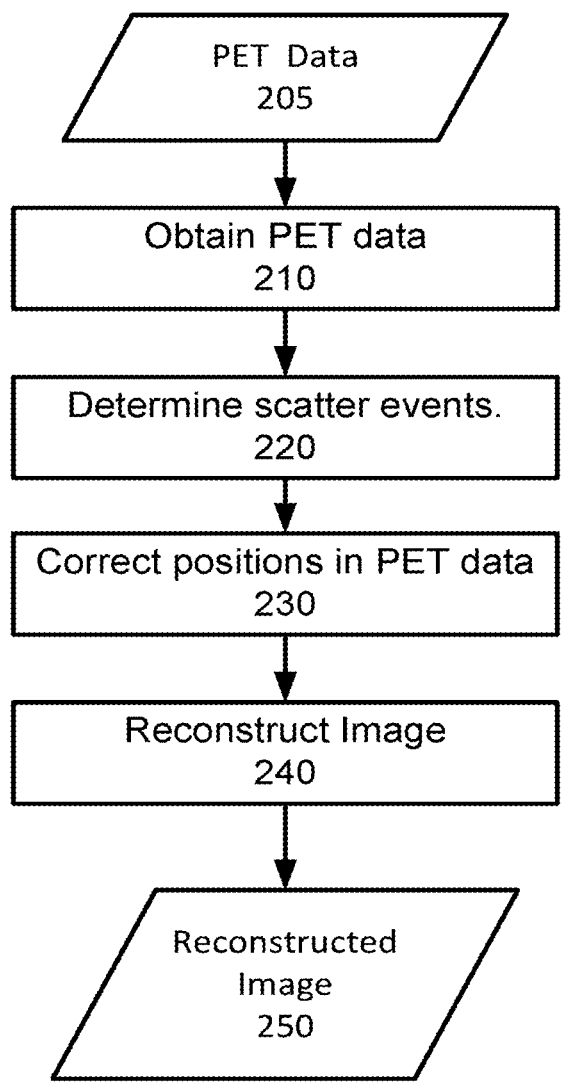
FIG. 5 shows a flow diagram of a method of correcting position measurements during which scattering occurred and reconstructing an image from the corrected positron-emission tomography (PET) data, according to one implementation.

FIG. 5 shows a non-limiting example of flow diagram of method 200 for processing emission data from a PET scanner.

In step 210 of method 200, the signals from the photodetectors are obtained as PET data 205. In certain implementations, the optical signals for all crystals in the gamma detector are isolated to reduce light/signal sharing, and each detector element has a respective SiPM that individually reads out the generated charge/current.

In step 220 of method 200, signals within a predefined time window from nearby crystals are grouped into scattered events. Each signal has its own crystal (central) position and energy: $\vec{X}_i$ and $E_i$. According to certain implementations, a threshold $E_{min}$ is applied to signals from the respective detector elements, such that only the signals with energy higher than the predefined threshold $E_{min}$ will be used to estimate the event's position In step 230 of method 200, the incident gamma ray's initial interaction point can be estimated using an inverse energy weighting, and the weight is the inverse energy raised to a power p, wherein p is a positive real number. That is the location of the incident gamma ray's initial interaction point can be estimated by $$\vec{X} = \frac{\sum \vec{X}_i / E_i^p}{\sum 1 / E_i^p},$$

wherein $\vec{X}_i$ is the location of the $i^{th}$ crystal element, $E_i$ is the measured energy of the $i^{th}$ crystal element, and $E_i^p$ is the measured energy raised to the power p, wherein p is a positive real number. The measured energy $E_i$ can be, e.g., the raw energy that is measured by the detector elements. Alternatively, the measured energy $E_i$ can be a calibrated/corrected value derived from the raw data for the measured energy. That is, the measured energy $E_i$ can be the measured energy value either before or after the raw data has been calibrated and/or corrected.

In step 240 of method 200, an image 250 is reconstructed from the corrected PET data. The image reconstruction can be performed using a list-mode or a sinogram based method, as would be understood as a person of ordinary skill in the art. Further, the image reconstruction can be performed using a back-projection method, a filtered back-projection method, a Fourier-transform-based image reconstruction method, an iterative image reconstruction method, a matrix-inversion image reconstruction method, a statistical image reconstruction method, or by optimizing an objective function having a data fidelity term (e.g., a log-likelihood based data fidelity term) and a regularization term (e.g., a total variation minimization or edge-preserving regularizer).

In certain implementations, the reconstruction algorithm assumes that the counts are coarse grained to be located at a crystal center. In this case, $\vec{X}$ can be rounded to the nearest crystal center.

In certain implementations, the reconstruction algorithm can be applied using sub-crystal resolution. For example, a crystal element can be subdivided into quadrants to provide finer resolution, and the estimated location of the incident gamma ray's initial interaction point can be rounded/converted to finer sub-crystal ID. With this method, the scanner can be treated as having smaller, virtual crystals. Depending on the uncertainty in the event location, a 4×4 mm crystal can be divided into 4 2×2 mm crystals or 16 1×1 mm crystals (or even further).

When image reconstruction is performed using the finer resolution afforded by sub-crystal IDs, the image reconstruction algorithm can use a system model that is based on the smaller sizes of the virtual crystals and reconstruct images as if the physical crystal sizes were smaller. Another approach is to use a list-mode reconstruction framework to reconstruct the image using the exact estimated location of an event (i.e., the floating position/point).

In certain implementations, the reconstruction algorithm can be applied using a floating number for the location $\vec{X}$ without rounding to a nearest crystal center or sub-crystal ID. For example, in list-mode reconstruction the exact value calculated for $\vec{X}$ can be used in the reconstruction.

Further, various processes within the emission data processing and image reconstruction work flow can be variously performed at the crystal and sub-crustal levels. That is, not all processes need to be performed using a same resolution (e.g., crystal versus sub-crystal resolution). Further, depending on the variation of statistics/count rates across different detector elements within the PET scanner, some detector elements can be resolved at the sub-crystal level while others (e.g., having lower counts or poorer statistics) can be resolved at the crystal level. For example, in Poison counting statistics the standard deviation is the square root of the average number of photons (i.e., gamma rays) counted. Thus, for detector elements closer to the edge of the PET scanner where the number of coincidence counts is generally lower subdividing a crystal element into sub-crystals with the corresponding subdivision of the counts among the sub-crystals might degrade the signal of noise ratios. Accordingly, for these edge detector crystals it might be more advantageous to not subdivide the crystals into sub-crystal IDs, whereas for crystals nearer the center of the PET scanner having a large number of counts the change in signal-to-noise ratio (SNR) would be not as significant allowing for an improvement to image quality due to the increased spatial accuracy offered by subdividing into sub-crystal IDs. Accordingly, within a given reconstruction method different approaches can be applied to the coincidence counts and position measurements corresponding to different crystals located throughout the PET scanner. Consequently, image quality is expected to improve in cases where there are sufficient counts at detector pairs to be divided into various regions inside the crystal. In contrast, improvements to image quality or resolution will be limited in very low count cases where there are very few events to distribute inside crystals.

In certain implementations, crystal efficiency normalization will use the original crystal sizes, while geometric normalization can be based on the smaller crystal sizes (e.g., sub-crystal IDs). This will incorporate the constraint that all small virtual crystals are portions of a single, larger physical crystal.

In certain implementations, the technique involves using smaller, virtual crystals (e.g., sub-crystal IDs) for crystals that have recorded more than a predefined number of counts and using the full crystal sizes for other crystals. In this approach the reconstruction method uses a flexible system model to account for variable crystal sizes but in order to make best use of location certainty improvements.

Further, different orders of scatter will have different statistical properties. For example, first order scatter (i.e., the gamma ray being scattered once) occurs more frequently than second-order scatter (i.e., the gamma ray being scattered twice) and higher orders of scatter. Thus, without sacrificing SNR, a crystal can be sub-divided into smaller (more) virtual sub-crystals to correct position measurements than can higher orders of scatter. Accordingly, in certain implementations, the position correction is performed using a finer resolution of virtual sub-crystals to correct the position of first-order scatter, and a coarser resolution of virtual sub-crystals to correct the position of second- and higher order scatter. For example, the crystal could be sub-divided using a 4-by-4 grid for correcting first-order scatter, and the crystal could be sub-divided using a 2-by-2 grid for correcting second-order scatter, without sub-dividing the crystal at all for higher-order scatter. That is, the closest scintillator crystal to the corrected location $\vec{X}$ is rounded to the nearest sub-crystal in which the crystal is sub-divided into more 1 sub-crystals for a single scatter event (i.e., first-order scatter) than for multiple scatter event (i.e., second- and higher-order scatter).

Figure 6A:
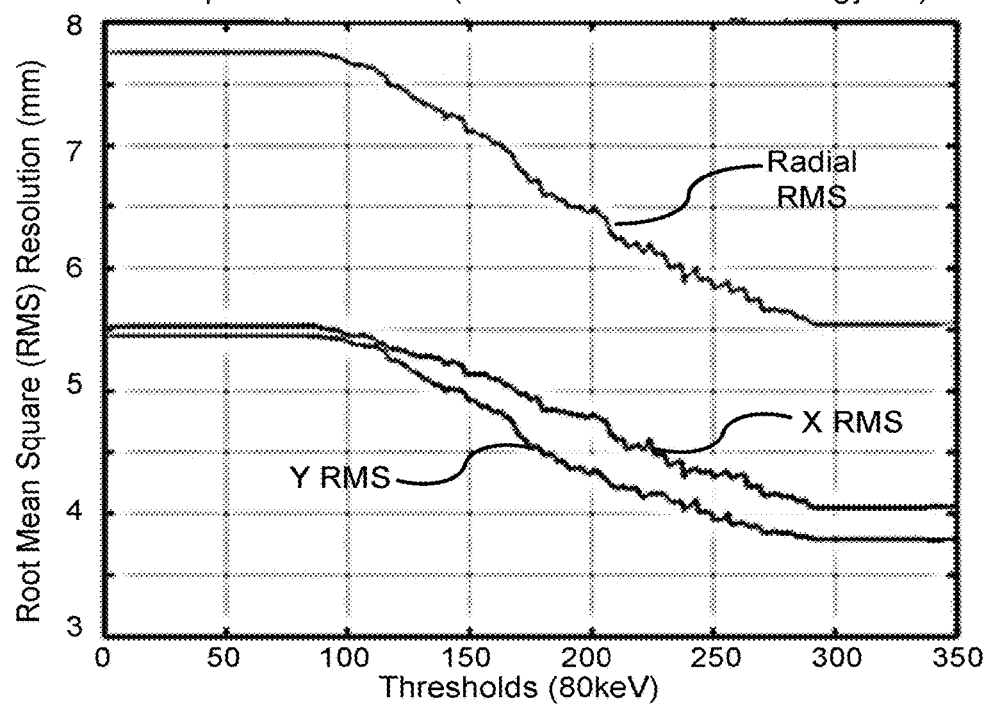
FIG. 6A shows a plot of resolution obtained using a joint method to correct position measurements, according to one implementation.
Figure 6B:
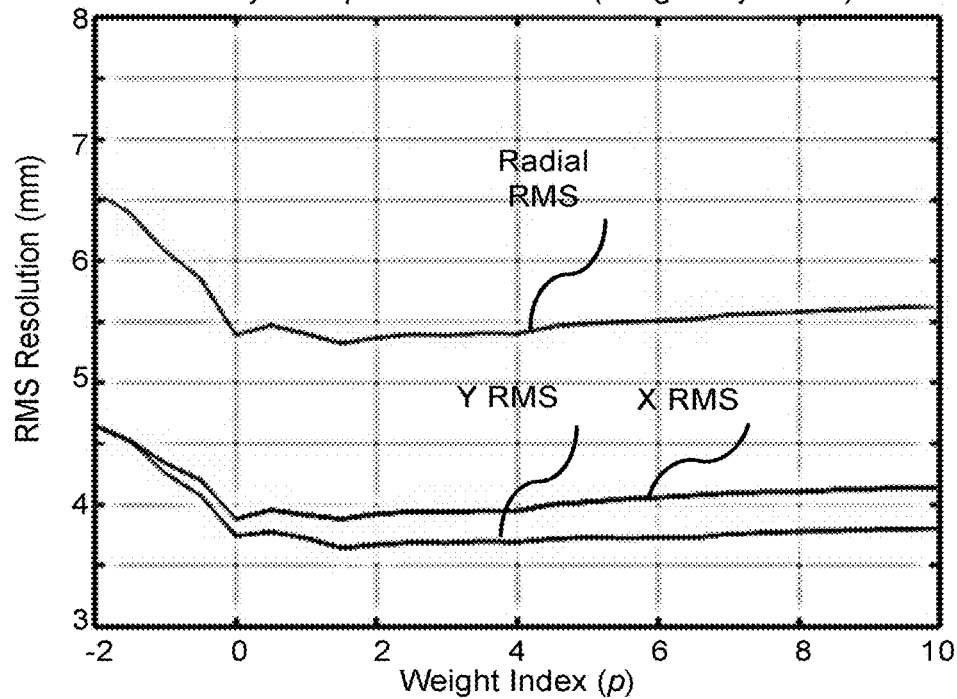
FIG. 6B shows a plot of resolution obtained using an inverse-energy-weighting method to correct position measurements corresponding to single scatter events, the method rounding the corrected positions to the nearest crystal center, according to one implementation.
Figure 6C:
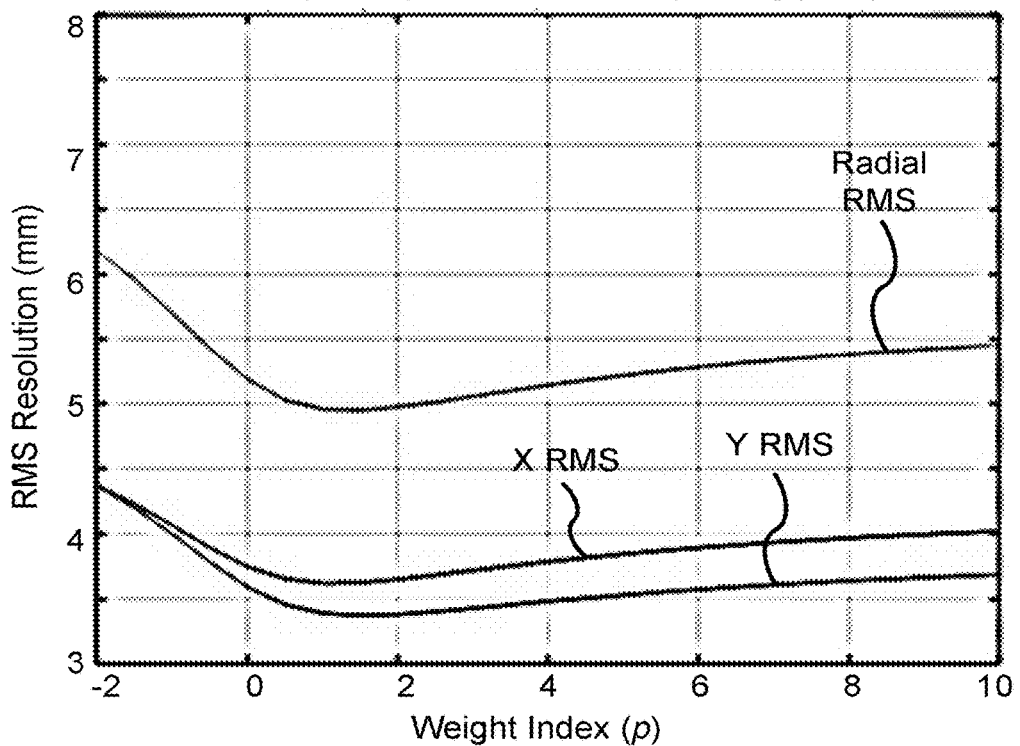
FIG. 6C shows a plot of resolution obtained using an inverse-energy-weighting method to correct position measurements corresponding to single scatter events, the method using a floating position as the corrected positions, according to one implementation.
Figure 6D:
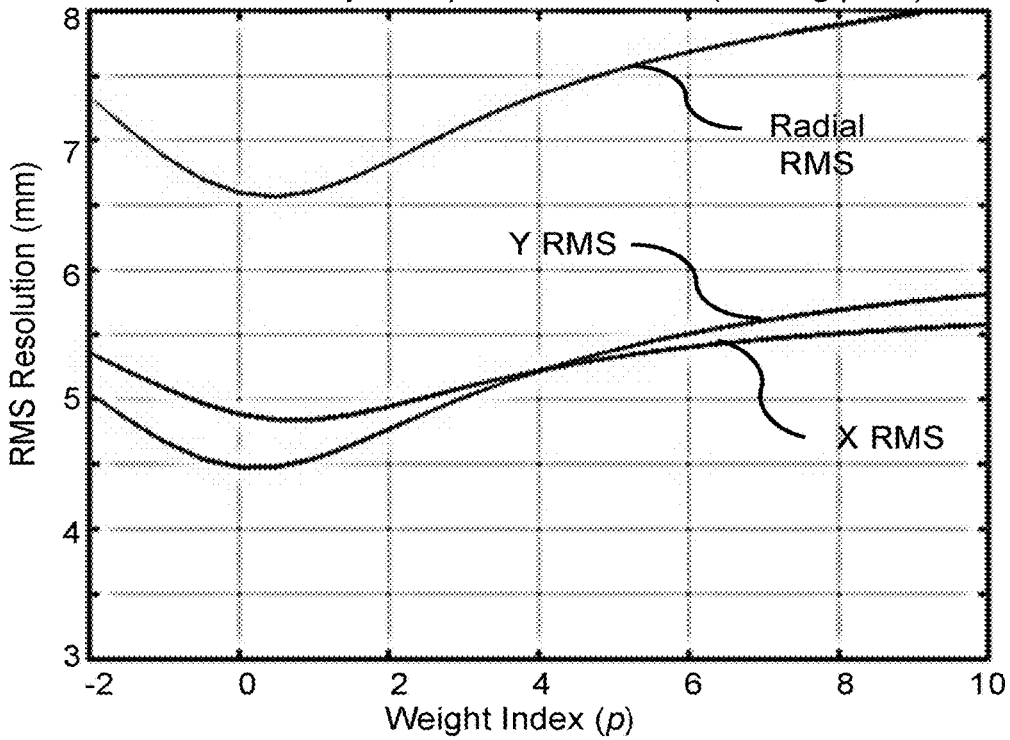
FIG. 6D shows a plot of resolution obtained using an inverse-energy-weighting method to correct position measurements corresponding to second-order scatter events, the method using a floating position as the corrected positions, according to one implementation.

FIGS. 6A, 6B, 6C, and 6D show resolution results, comparing the joint algorithm with the inverse weighting algorithm. These resolution results were generated using a collimated 511 keV gamma source, using a minimum energy threshold of $E_{min}$=80 keV, and a crystal size of 4.14×4.14× 20 mm$^3$. FIG. 6A shows, for the joint algorithm, the root mean square (RMS) error in the X- and Y-directions as well as for the radius $r=\sqrt{x^2+y^2}$, which are plotted as a function of the threshold energy below which the first crystal is determined by the second largest signal method. Similarly, FIG. 6B shows the RMS error for the inverse weighting method applied to single scatter events when the corrected position is rounded to the position of the nearest crystal. The inverse energy weight is raised to the power p, which is indicated as the weight index displayed on the horizontal axis. As can be seen by comparing FIGS. 6A and 6B, the inverse weighting method is not only simpler and more robust, but also produces better resolution than the joint algorithm, with the best resolution for this particular arrangement of detector elements occurring at about the power of p≈2. FIG. 6C shows that the resolution was further improved using floating values for the detection locations, as opposed to rounding to the nearest crystal, as in FIG. 6B. The best resolution for this particular arrangement of detector elements occurs at about the power of p≈1.5. FIG. 6D shows that the resolution for higher-order scatter, i.e., when three crystals register energies greater than the minimum threshold of 80 keV. There is no point of comparison for the joint method because the joint method is not equipped to handle higher-order scatter. Unsurprisingly, the resolution for higher-order scatter is slightly poorer than for first-order scatter, but of 6.5 mm RMS for the radius is close to the 5.5 mm resolution achieved for first order scatter using the joint algorithm.

Further, FIGS. 6B, 6C, and 6D show that the resolution can be affected by the choice of the power p to which the inverse-energy weighting is raised. Accordingly, the optimal value for the power p can be determined empirically through calibration. Similarly, the optimal value for the minimum energy threshold $E_{min}$ can also be determined empirically through calibration.

Figure 7A:
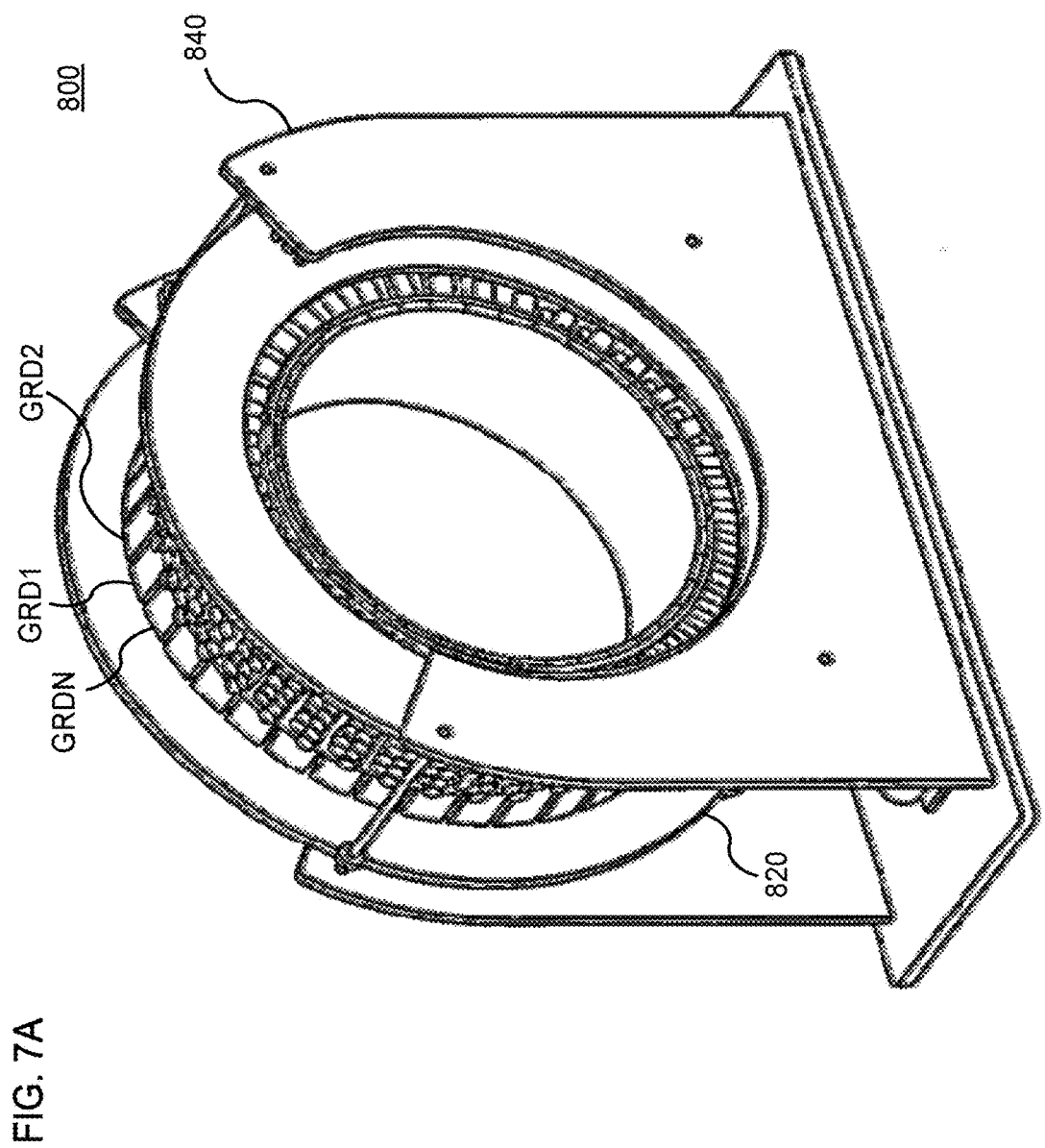
FIG. 7A shows a perspective view of a positron-emission tomography (PET) scanner, according to one implementation.
Figure 7B:
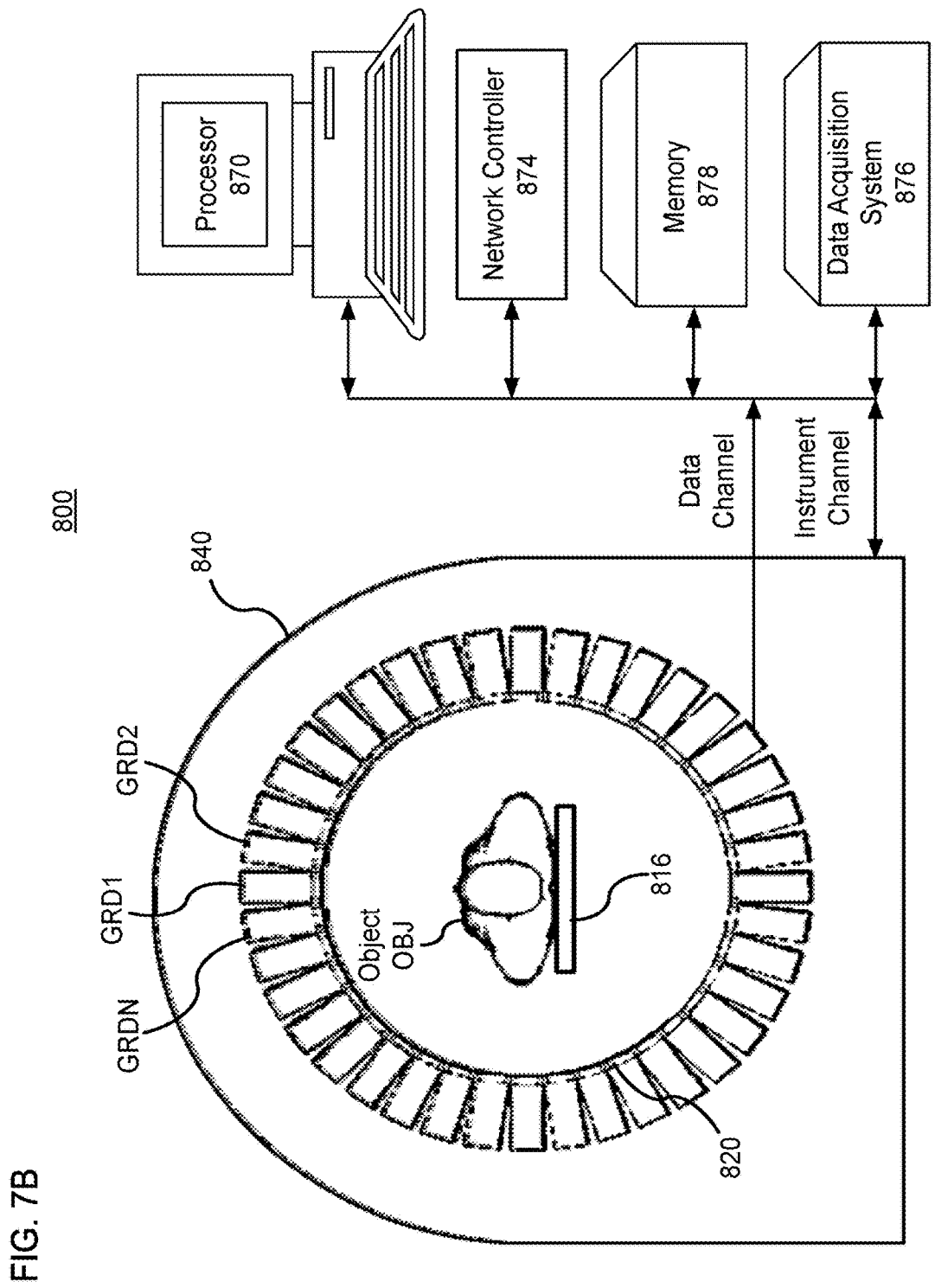
FIG. 7B shows a schematic view of the PET scanner, according to one implementation.

FIGS. 7A and 7B show a non-limiting example of a PET scanner 800 that can implement the method 200. The PET scanner 800 includes a number of gamma-ray detectors (GRDs) (e.g., GRD1, GRD2, through GRDN) that are each configured as rectangular detector modules. According to one implementation, the detector ring includes 40 GRDs. In another implementation, there are 48 GRDs, and the higher number of GRDs is used to create a larger bore size for the PET scanner 800.

Each GRD can include a two-dimensional array of individual detector crystals, which absorb gamma radiation and emit scintillation photons. The scintillation photons can be detected by a two-dimensional array of photomultiplier tubes (PMTs) that are also arranged in the GRD. A light guide can be disposed between the array of detector crystals and the PMTs.

Alternatively, the scintillation photons can be detected by an array a silicon photomultipliers (SiPMs), and each individual detector crystals can have a respective SiPM.

Each photodetector (e.g., PMT or SiPM) can produce an analog signal that indicates when scintillation events occur, and an energy of the gamma ray producing the detection event. Moreover, the photons emitted from one detector crystal can be detected by more than one photodetector, and, based on the analog signal produced at each photodetector, the detector crystal corresponding to the detection event can be determined using Anger logic and crystal decoding, for example.

FIG. 7B shows a schematic view of a PET scanner system having gamma-ray (gamma-ray) photon counting detectors (GRDs) arranged to detect gamma-rays emitted from an object OBJ. The GRDs can measure the timing, position, and energy corresponding to each gamma-ray detection. In one implementation, the gamma-ray detectors are arranged in a ring, as shown in FIGS. 7A and 8B. The detector crystals can be scintillator crystals, which have individual scintillator elements arranged in a two-dimensional array and the scintillator elements can be any known scintillating material. The PMTs can be arranged such that light from each scintillator element is detected by multiple PMTs to enable Anger arithmetic and crystal decoding of scintillation event.

FIG. 7B shows an example of the arrangement of the PET scanner 800, in which the object OBJ to be imaged rests on a table 816 and the GRD modules GRD1 through GRDN are arranged circumferentially around the object OBJ and the table 816. The GRDs can be fixedly connected to a circular component 820 that is fixedly connected to the gantry 840. The gantry 840 houses many parts of the PET imager. The gantry 840 of the PET imager also includes an open aperture through which the object OBJ and the table 816 can pass, and gamma-rays emitted in opposite directions from the object OBJ due to an annihilation event can be detected by the GRDs and timing and energy information can be used to determine coincidences for gamma-ray pairs.

In FIG. 7B, circuitry and hardware is also shown for acquiring, storing, processing, and distributing gamma-ray detection data. The circuitry and hardware include: a processor 870, a network controller 874, a memory 878, and a data acquisition system (DAS) 876. The PET imager also includes a data channel that routes detection measurement results from the GRDs to the DAS 876, a processor 870, a memory 878, and a network controller 874. The data acquisition system 876 can control the acquisition, digitization, and routing of the detection data from the detectors. In one implementation, the DAS 876 controls the movement of the bed 816. The processor 870 performs functions including reconstructing images from the detection data, pre-reconstruction processing of the detection data, and post-reconstruction processing of the image data, as discussed herein.

The processor 870 can be configured to perform various steps of method 200 described herein and variations thereof. The processor 870 can include a CPU that can be imple-mented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory may be non-volatile, such as ROM, EPROM, EEPROM or FLASH memory. The memory can also be volatile, such as static or dynamic RAM, and a processor, such as a microcontroller or microprocessor, may be provided to manage the electronic memory as well as the interaction between the FPGA or CPLD and the memory.

Alternatively, the CPU in the processor 870 can execute a computer program including a set of computer-readable instructions that perform various steps of method 200, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

The memory 878 can be a hard disk drive, CD-ROM drive, DVD drive, FLASH drive, RAM, ROM or any other electronic storage known in the art.

The network controller 874, such as an Intel Ethernet PRO network interface card from Intel Corporation of America, can interface between the various parts of the PET imager. Additionally, the network controller 874 can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including EDGE, 3G and 4G wireless cellular systems. The wireless network can also be WiFi, Bluetooth, or any other wireless form of communication that is known.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:
1. A positron emission imaging apparatus, comprising:
processing circuitry configured to
obtain emission data representing positions and energies of gamma rays incident at a plurality of detector elements, each detector element of the plurality of detector elements including a respective photodetector and scintillator crystal, the scintillator crystal of the each detector element being, at least partially, isolated from other scintillator crystals of the plurality of detector elements, correct an incident position of a primary gamma ray, when the primary gamma ray is scattered, using an inverse-energy weighting to combine a position of the primary gamma ray with a position of a corresponding scattered gamma ray to generate a corrected position, wherein the inverse-energy weighting divides a respective position of the emission data by a corresponding energy of the emission data that have been raised to a power p, wherein p is a positive number, and reconstruct an image using the emission data together with the corrected position.

2. The apparatus according to claim 1, wherein the processing circuitry is further configured to correct the incident position by sub-dividing a cross-sectional area of a closest scintillator crystal of the plurality of detector elements, which is closest to the corrected position, into virtual sub-crystals, and identifying the corrected position as being at one of the sub-crystals for which a distance measure to the corrected position is smallest.

3. The apparatus according to claim 2, wherein the processing circuitry is further configured to correct the incident position, wherein the identifying the corrected position as being at the one of the sub-crystals is performed using the distance measure that is a Euclidean distance from a respective center of a virtual sub-crystal to the corrected position.

4. The apparatus according to claim 1, wherein the processing circuitry is further configured to correct the incident position by applying an energy threshold to the energies the plurality of detector elements that occur within a detection time window, and determining that the scattered gamma ray was detected when two or more of the energies detected within the detection time window exceed the energy threshold, and the combination of crystal positions for the corrected position is calculated by summing applying the inverse-energy weighting to crystal positions of detector elements corresponding to the energies exceeding the energy threshold to generate weighted crystal positions and then summing the weighted crystal positions.

5. The apparatus according to claim 1, wherein the processing circuitry is further configured to correct the incident position, wherein p is an integer in a range from 0 to 10.

6. The apparatus according to claim 1, wherein the processing circuitry is further configured to correct the incident position, wherein the corrected position is a floating position that is independent of a crystal grid of the plurality of detector elements.

7. The apparatus according to claim 2, wherein the processing circuitry is further configured to correct the incident position by applying a sub-division criterion to determine whether to sub-divide the closest scintillator crystal into the virtual sub-crystals.

8. The apparatus according to claim 2, wherein the processing circuitry is further configured to correct the incident position, wherein the sub-division criterion is that the closest scintillator crystal is sub-divided in to the virtual sub-crystals when, for the emission data, a count of corrected positions for the closest scintillator crystal exceeds a count threshold.

9. The apparatus according to claim 2, wherein the processing circuitry is further configured to correct the incident position, wherein the closest scintillator crystal is sub-divided into more virtual sub-crystals when the primary gamma ray results in a single scattered gamma ray than when the primary gamma ray results in multiple scattered gamma rays.

10. The apparatus according to claim 4, wherein the processing circuitry is further configured to calibrate, using calibration data, an optimal value for the energy threshold and an optimal value for the power p, which is used to calculate the inverse energy weights.

11. A positron emission imaging method, comprising:

obtaining emission data representing positions and energies of gamma rays incident at a plurality of detector elements, each detector element of the plurality of detector elements including a respective photodetector and scintillator crystal, the scintillator crystal of the each detector element being, at least partially, isolated from other scintillator crystals of the plurality of detector elements, correcting an incident position of a primary gamma ray, when the primary gamma ray is scattered, using an inverse-energy weighting to combine a position of the primary gamma ray with a position of a corresponding scattered gamma ray to generate a corrected position, wherein the inverse-energy weighting divides a respective position of the emission data by a corresponding energy of the emission data that have been raised to a power p, wherein p is a positive number, and reconstructing an image using the emission data together with the corrected position.

12. The method according to claim 11, wherein the correcting of the incident position is performed by sub-dividing a cross-sectional area of a closest scintillator crystal of the plurality of detector elements, which is closest to the corrected position, into virtual sub-crystals, and identifying the corrected position as being at one of the sub-crystals for which a distance measure to the corrected position is smallest.

13. The method according to claim 12, wherein the correcting of the incident position includes that the identifying the corrected position as being at the one of the sub-crystals is performed using the distance measure that is a Euclidean distance from a respective center of a virtual sub-crystal to the corrected position.

14. The method according to claim 11, wherein the correcting of the incident position is performed by applying an energy threshold to the energies the plurality of detector elements that occur within a detection time window, and determining that the scattered gamma ray was detected when two or more of the energies detected within the detection time window exceed the energy threshold, and the combination of crystal positions for the corrected position is calculated by summing applying the inverse-energy weighting to crystal positions of detector elements corresponding to the energies exceeding the energy threshold to generate weighted crystal positions and then summing the weighted crystal positions.

15. The method according to claim 11, wherein the correcting of the incident position includes that the corrected position is a floating position that is independent of a crystal grid of the plurality of detector elements.

16. The method according to claim 11, wherein the correcting of the incident position includes that the power p, which is used in the inverse-energy weighting, is an integer in a range from 0 to 10.

17. The method according to claim 12, wherein the correcting of the incident position is performed by applying a sub-division criterion to determine to sub-divide the closest scintillator crystal into the virtual sub-crystals when, for the emission data, a count of corrected positions for the closest scintillator crystal exceeds a count threshold.

18. The method according to claim 12, wherein the correcting of the incident position includes that the closest scintillator crystal is sub-divided into more virtual sub-crystals when the primary gamma ray results in a single scattered gamma ray than when the primary gamma ray results in multiple scattered gamma rays.

19. The method according to claim 14, further comprising:
   calibrating, using calibration data, an optimal value for the energy threshold and an optimal value for the power p, which is used to calculate the inverse energy weights.

20. A non-transitory computer readable storage medium including executable instructions, wherein the instructions, when executed by circuitry, cause the circuitry to perform the method according to claim 11.

\* \* \* \* \*